(12) United States Patent
Gurtler (10) Patent No.: US 7,108,272 B1
(45) Date of Patent: Sep. 19, 2006

(54) TRAILER HITCH CUSHIONING DEVICE AND METHOD FOR USING SAME

(76) Inventor: Wendell A. Gurtler, 315 Western Ave., Iowa Falls, IA (US) 50126

( * ) Notice: Subject to any disclaimer, the term of this patent is extended or adjusted under 35 U.S.C. 154(b) by 8 days.

(21) Appl. No.: 10/810,969

(22) Filed: Mar. 26, 2004

(51) Int. Cl.
*B60D 1/50* (2006.01)

(52) U.S. Cl. ........................................ 280/289; 280/285

(58) Field of Classification Search ................ 280/483, 280/484, 485, 486, 489, 490.1, 468, 414.5
See application file for complete search history.

(56) References Cited

U.S. PATENT DOCUMENTS

| | | | |
|---|---|---|---|
| 1,840,435 A * | 1/1932 | Davis | 280/489 |
| 3,223,435 A * | 12/1965 | Yarbrough | 280/489 |
| 3,250,548 A * | 5/1966 | Barkley | 280/489 |
| 3,284,098 A * | 11/1966 | Worley | 280/406.2 |
| 4,314,709 A * | 2/1982 | Silbernagel | 280/81.6 |
| 4,351,542 A * | 9/1982 | Lovell et al. | 280/489 |
| 4,580,806 A * | 4/1986 | Kolstad et al. | 280/407 |
| 5,328,198 A * | 7/1994 | Adams | 280/439 |
| 5,388,849 A | 2/1995 | Arsenault et al. | |
| 5,549,322 A * | 8/1996 | Hauri | 280/86.5 |
| 5,683,094 A | 11/1997 | Gullickson | |
| 5,785,341 A | 7/1998 | Fenton | |
| 5,823,560 A | 10/1998 | Van Vleet | |
| 5,836,603 A * | 11/1998 | Logan et al. | 280/483 |
| 5,887,884 A | 3/1999 | Smith | |
| 6,116,631 A | 9/2000 | Logan et al. | |
| 6,170,849 B1 * | 1/2001 | McCall | 280/433 |
| 6,182,997 B1 | 2/2001 | Ullrich et al. | |
| 6,581,951 B1 | 6/2003 | Lange | |
| 6,746,037 B1 * | 6/2004 | Kaplenski et al. | 280/484 |
| 2001/0035629 A1 | 11/2001 | Piercey, III | |

OTHER PUBLICATIONS

Bob Sagen, The Story of Travel Lite and the Air Shocker, Shockerhitch.com website, original date of publication unknown.

* cited by examiner

*Primary Examiner*—Lesley D. Morris
*Assistant Examiner*—Daniel Yeagley
(74) *Attorney, Agent, or Firm*—Sturm & Fix LLP (57) ABSTRACT

The present invention includes a base frame or hitch receiver which can be attached to the under surface of a pulling vehicle. A hitch frame is pivotally mounted to the base frame for pivotal movement about a horizontal axis. An air bag is positioned between the base frame and the hitch frame and is adapted to collapse in response to downward movement of the forward end of the hitch frame. This collapsing of the air bag causes the air within to be compressed so that it resist downward movement of the forward end of the hitch bar.

15 Claims, 6 Drawing Sheets

TRAILER HITCH CUSHIONING DEVICE AND METHOD FOR USING SAME

BACKGROUND OF THE INVENTION

The present invention relates to a trailer hitch cushioning device and method for using same.

Figure 1:
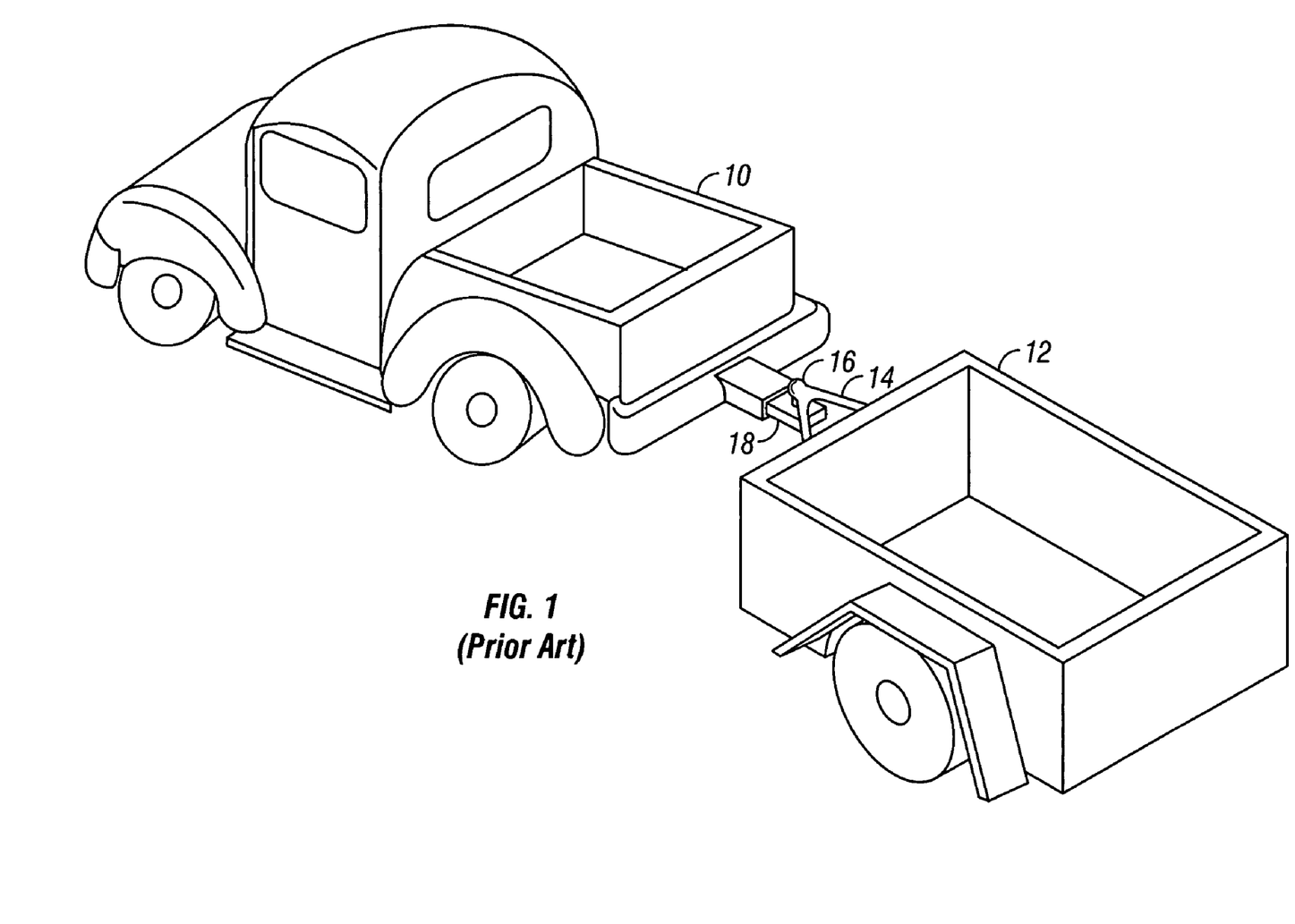
FIG. 1 is a perspective view of a pulling vehicle attached to a trailer.

Trailer hitches are generally used to connect a pulling vehicle to a trailer. A typical example of such a combination is shown in FIG. 1 which shows a pulling vehicle 10 which is pulling a trailer 12. A trailer tongue 14 extends from the front of trailer 12 and includes a hitch socket 16 at its forward end. A ball hitch 18 is fitted within the hitch socket and secured in place to attach the trailer 12 to the vehicle 10. The structure shown in FIG. 1 is merely an example, and any kind of trailer hitch, whether a ball hitch or other types of hitching devices may be utilized with respect to the present invention. When the vehicle 10 pulls the trailer 12 the load in the trailer creates a downward force on the hitch socket 16. During the movement of the vehicle 10 when the trailer crosses a bump, this movement can have an erratic effect upon the pulling vehicle 10 and can influence the steerage and bouncing of the vehicle 10. Therefore it is desirable to provide a means for cushioning or damping the downward force created by the front end of the trailer tongue 14 during movement of the vehicle and the trailer over a bump.

Therefore a primary object of the present invention is the provision of an air cushioning or damping device and method for using same which dampens the downward movement of the trailer tongue in response to going over bumps or other irregular surfaces.

A further object of the present invention is the provision of a trailer hitch cushioning device and method for using same which is easy to mount to the underside of a towing vehicle, or which can be attached to a conventional hitch receiver already mounted to a vehicle.

A further object of the present invention is the provision of a trailer hitch cushioning device and method for using same which permits pivotal movement of the hitch frame relative to a base frame that is bolted to the vehicle.

A further object of the present invention is the provision of a trailer hitch cushioning device and method for using same which utilizes an air bag to cushion the downward movement of the hitch as it pivots relative to a base frame.

A further object of the present invention is the provision of a trailer hitch cushioning device and method for using same which can be pivoted either at the rear of the hitch frame, at the front of the hitch frame, or at any place along the intermediate length of the hitch frame.

A further object of the present invention is the provision of a trailer hitch cushioning device and method for using same which utilizes an air bag positioned between the hitch and the pivot point of the hitch frame.

A further object of the present invention is the provision of a trailer hitch cushioning device and method for using same which places the pivot point of the hitch frame between the air bag and the hitch.

A further objection of the present invention is the provision of a trailer hitch cushioning device and method for using same which permits the air bag to be collapsed either in a vertical direction or in a horizontal direction in response to downward movement of the hitch frame.

A further object of the present invention is the provision of a trailer hitch cushioning device and method for using same which are economical in manufacture, durable in use, and efficient in operation.

BRIEF SUMMARY OF THE INVENTION

The foregoing objects may be achieved by a trailer hitch assembly for use with a trailer and a pulling vehicle. A hitch is adapted to be connected to the trailer. An elongated hitch member includes a first end connected to the hitch and a second end. A base frame is adapted to be attached to the pulling vehicle. A moveable connection between the hitch member and the base frame permits the hitch and the hitch member to move between a first position and a second position relative to the base frame assembly. An inflatable apparatus is connected to both of the hitch member and the base frame and includes a container having a quantity of gas. The inflatable apparatus is flexible so as to compress and cause the quantity of gas within the container to increase in pressure in response to movement of the hitch and the hitch member between the first and second positions relative to the base frame assembly.

According to another feature of the present invention, the moveable connection comprises a pivotal connection of the hitch member to the base frame for permitting pivotal movement about a horizontal axis.

According to another feature of the present invention, the pivotal connection is located adjacent the second end of the hitch member.

According to another feature of the present invention, the inflatable apparatus is connected to the elongated hitch member between the pivotal connection and the hitch.

According to another feature of the present invention, the pivotal connection is spaced from the second end of the hitch member and located between the second end of the hitch member and the hitch.

According to another feature of the present invention, the inflatable apparatus is connected to the elongated hitch member at a point wherein the pivotal connection is located between the inflatable apparatus and the hitch.

According to another feature of the present invention, the inflatable apparatus is an air bag.

According to another feature of the present invention, the inflatable apparatus includes a first attachment member attached to the hitch member and a second attachment member attached to the base frame. The first and second attachment members are moveable in response to movement of the hitch and the hitch member between the first and second positions.

According to another feature of the present invention, the first attachment member is moveable vertically with respect to the second attachment member in response to movement of the hitch member and the hitch between the first and second positions.

According to another feature of the present invention, the first attachment member is moveable in a horizontal direction with respect to the second attachment member in response to movement of the hitch member and the hitch between the first and second positions.

According to another feature of the present invention, a shock absorber comprises a first shock absorber end connected to the base frame and a second shock absorber end connected to the hitch member.

The foregoing objects may also be achieved by the a method of the present invention for cushioning the vertical downward movement of the tongue of a trailer relative to the rear of the vehicle. The method comprises attaching a base frame to the rear of the vehicle. A hitch frame is then connected to the base frame for pivotal movement about a first pivot axis, the hitch frame having a hitch attached thereto. Next, the hitch is attached to the tongue of the trailer.

The hitch frame is then pivoted relative to the base frame for pivotal movement about the first pivotal axis so that the hitch moves from an elevated position to a lowered position relative to the base frame. A flexible collapsible air container is connected between the hitch frame and the base frame, and collapses in response to movement of the hitch from the elevated to the lowered position. The air container contains a quantity of air therein whereby the collapsing of the air container causes the pressure of the quantity of air to increase so as to resist the movement of the hitch from the elevated to the lowered position.

DETAILED DESCRIPTION OF THE PREFERRED EMBODIMENT

Figure 2:
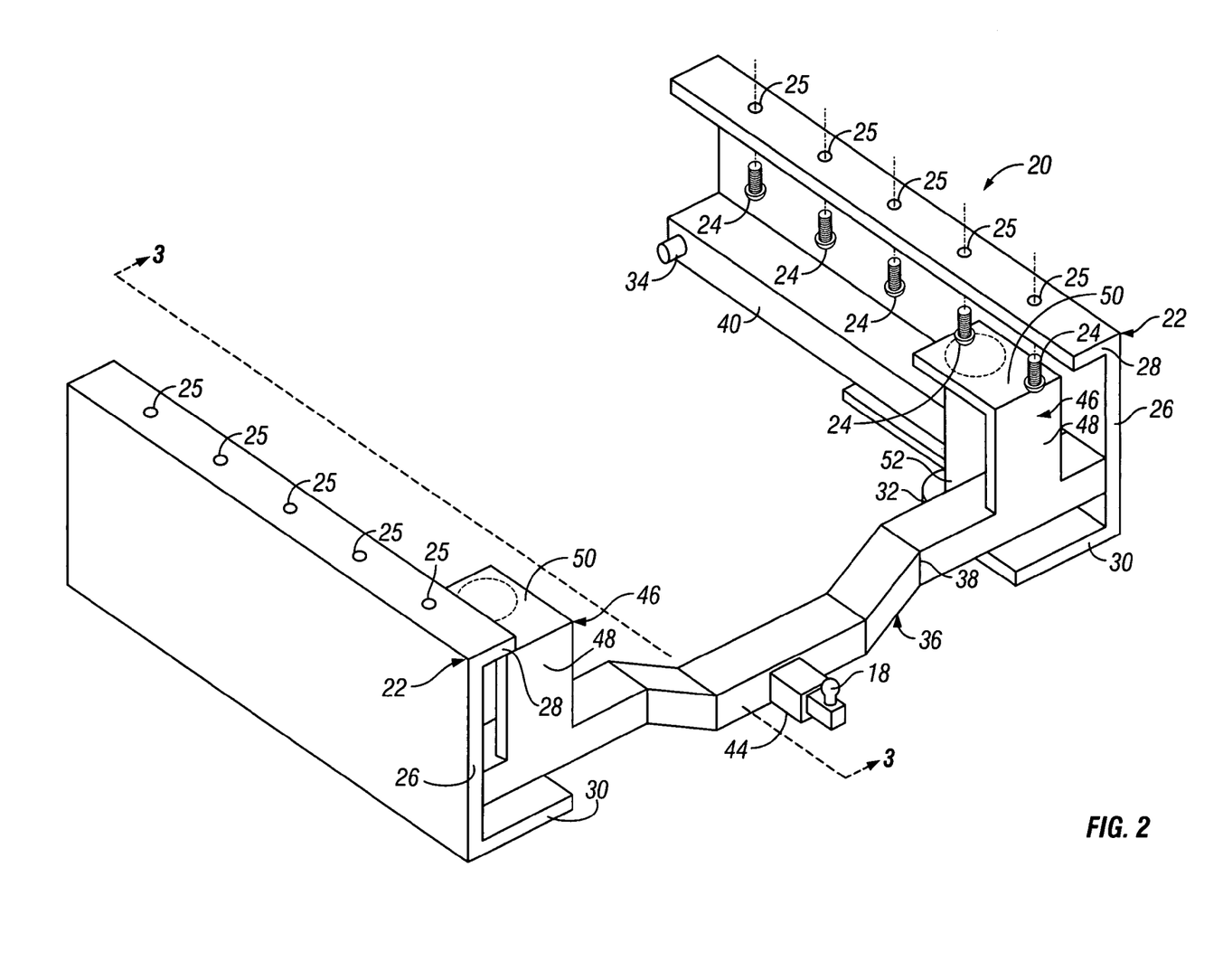
FIG. 2 is a perspective view of a first embodiment of the present invention.
Figure 3:
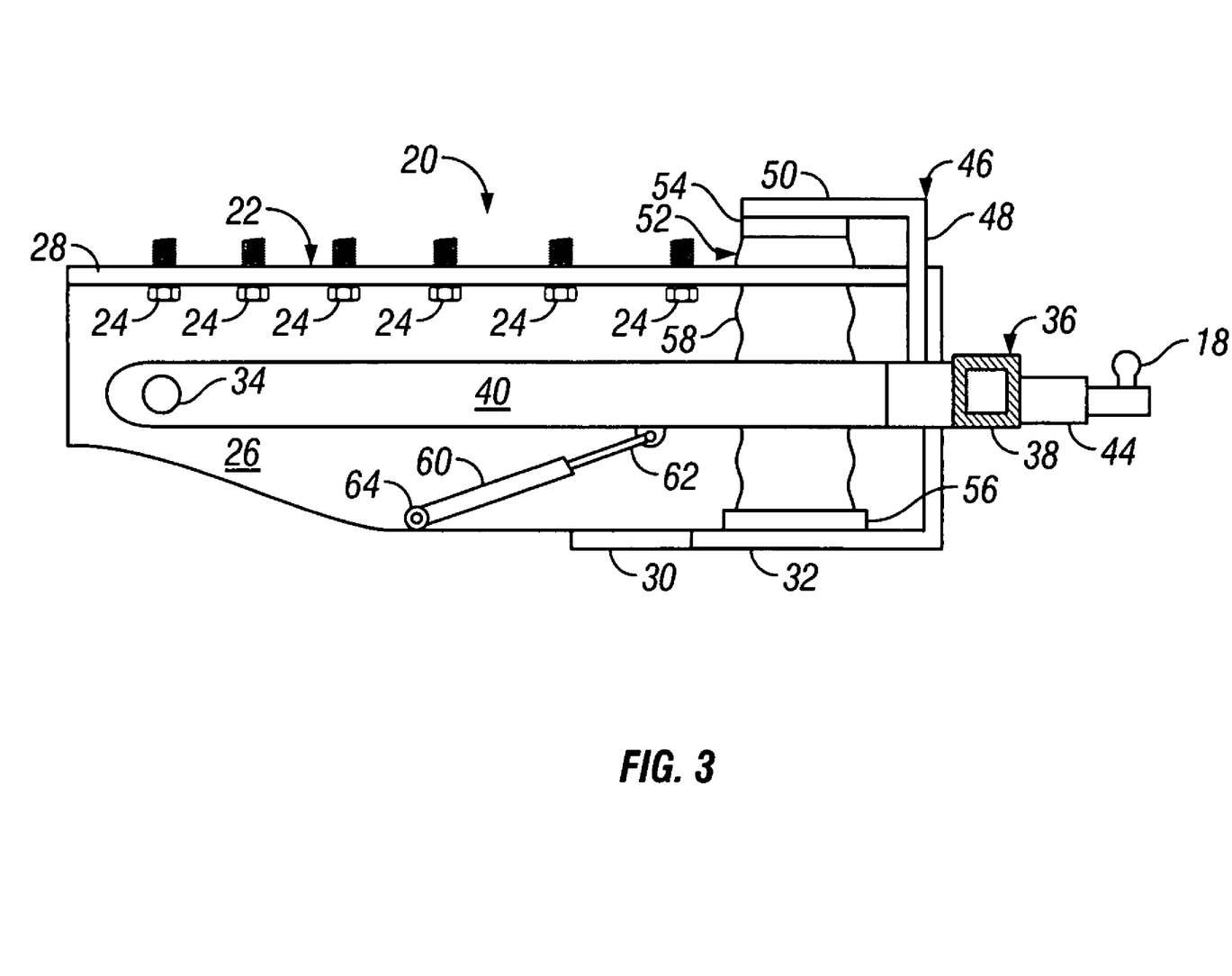
FIG. 3 is a sectional view taken along line 3—3 of FIG. 2.

Referring to FIGS. 2 and 3, a first embodiment of the present invention is designated by the numeral 20. Embodiment 20 includes two spaced apart base frames 22 each of which is C-shaped in cross section and include bolts 24 extending upwardly through bolt holes 25 in an upper flange 28. Bolts 24 are used to attach base frames 22 to pulling vehicle 10, but other devices may be used to attach the base frames 22. A vertical web 26 extends downwardly from each upper flange 28 and includes a lower flange 30 at its lower end. Lower flanges 30 extend rearwardly to an air bag flange 32. At the rear end of each base frame 22 is a horizontal pivot pin 34.

A hitch frame 36 includes a central hitch frame member 38 having a pair of side hitch frame members 40 extending rearwardly therefrom. At the forward end of hitch frame 36 is a hitch receiver 44 which telescopically receives the ball hitch bar 18. Extending upwardly from the opposite sides of central hitch frame member 38 are a pair of L-shaped upper bag frames 46, each comprising a vertical leg 48 and a horizontal leg 50. The L-shaped bag frames 46 are shown inside base frames 22 but it is also possible to position them outside the base frames 22, along with the air bags 52. An air bag 52 includes an upper bag end 54 attached to the horizontal leg 50 and a lower bag end 56 attached to the air bag flange 32. The air bag 52 also includes a central collapsible section 58 (FIG. 3). Air bag 52 is adapted to receive a quantity of air therein. The amount of air can be increased or decreased to achieve the desired resistance to downward movement of hitch 18.

The pivot pin 34 extending from base frame 22 is pivotally connected to the rear end of each of the side frame members 40 as shown in both FIGS. 2 and 3. This permits the hitch frame 36 to pivot upwardly and downwardly about the pivotal axis 34. When the hitch 18 moves downwardly it causes the collapsible section 58 of the air bag 52 to collapse and the result is that the pressure of the air within the air bag 52 is increased. This increased pressure resists the downward movement of the hitch 18, and therefore the downward movement of the hitch 18 is dampened. The force that resists the downward movement of hitch 18 can be adjusted by introducing various pressures of air into the air bag 52.

A shock absorber 60 includes an upper end 62 connected to at least one of the side frame members 40 and includes a lower end 64 connected to the vertical web 26 of the base frame 22. The shock absorber 60 also aids in the dampening both the upward and downward movement of hitch 18.

Figure 4:
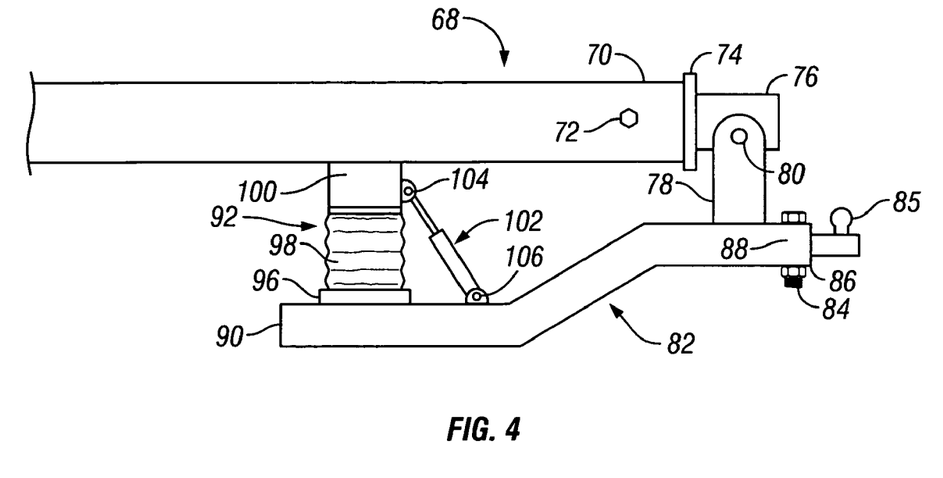
FIG. 4 is a side elevational view showing a second embodiment of the present invention.
Figure 5:
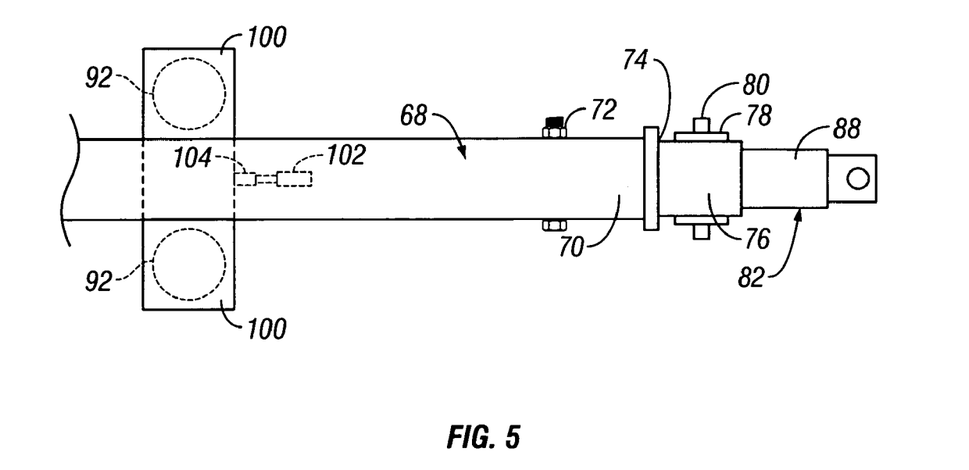
FIG. 5 is a sectional view taken along line 5—5 of FIG. 4.

Referring to FIGS. 4 and 5, a second embodiment of the invention is designated by the numeral 68. Second embodiment 68 includes a base frame or receiver 70 adapted to be bolted to, or otherwise attached to, the frame of the pulling vehicle 10. The forward end receiver 70 includes a receptacle 74 which telescopically receives a mounting bar 76. Receiver 70 and receptacle 74 are of conventional construction and receiver 70 is normally adapted to receive hitch 85.

A hitch frame 82 is pivoted to the mounting bar 76 by a pair of pivot flanges 78 which pivot about a pin or pivot axis 80. The pivot flanges 78 are welded to hitch frame 82. Hitch frame 82 includes a hitch frame receptacle 86 having a bolt 84 which retentively holds the hitch 85 that is telescopically fitted within the hitch frame receptacle 86. Hitch frame 82 includes a forward end 88 and a rear end 90. An air bag 92 includes an upper portion 94 that is attached to a cross bar 100 which is welded to the bottom surface of receiver 70. A lower portion 96 of the air bag 92 is attached to the rear end 90 of hitch frame 82. The air bag 92 includes a flexible center 98 which contains a quantity of air. A shock absorber 102 includes an upper end 104 attached to the cross bar 100 and a lower end 106 attached to the hitch frame 82. The upper end 104 may alternatively be attached directly to the base frame or receiver 68.

The primary difference between the embodiment shown in FIGS. 4 and 5 and the embodiment shown in FIGS. 2 and 3 is that the pivot point 80 of the device shown in FIGS. 4 and 5 is located adjacent the front end of the receiver 70 and the hitch frame 82, as opposed to the rear as shown in FIGS. 2 and 3. Also, the air bag 92 in FIGS. 4 and 5 is located at the rear end of the base frame 68 and the hitch frame 82, rather than at the forward end as shown by FIGS. 2 and 3. In FIGS. 2 and 3 the air bag is between the pivot point and the hitch. In FIGS. 4 and 5 the pivot point is between the air bag 92 and the hitch 85.

However, in both embodiments the air bag compresses when the hitch is moved in a downward direction. This dampens the downward movement of the hitch 85. Similarly, shock absorber 102 facilitates dampening the movement of the hitch 85 in an upward direction.

Figure 6:
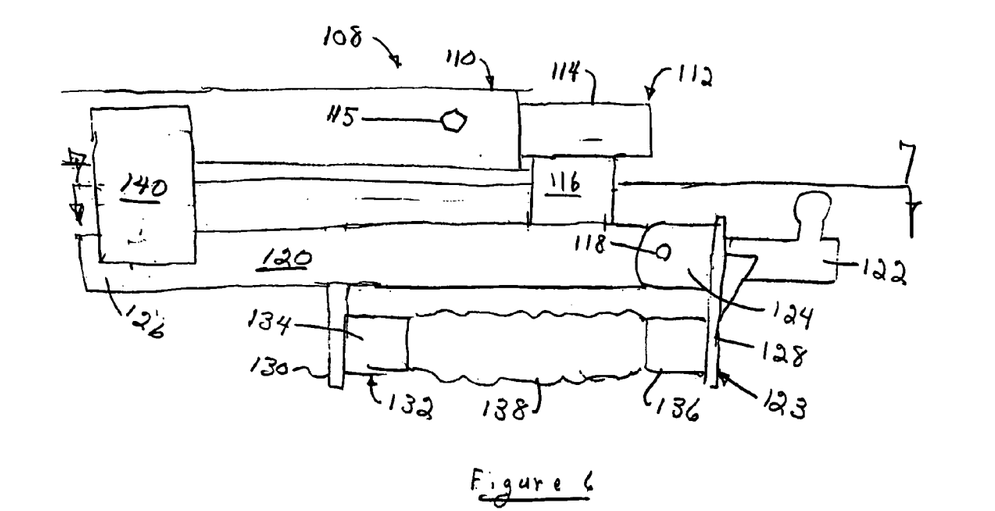
FIG. 6 is a side elevational view of a third embodiment of the present invention.
Figure 7:
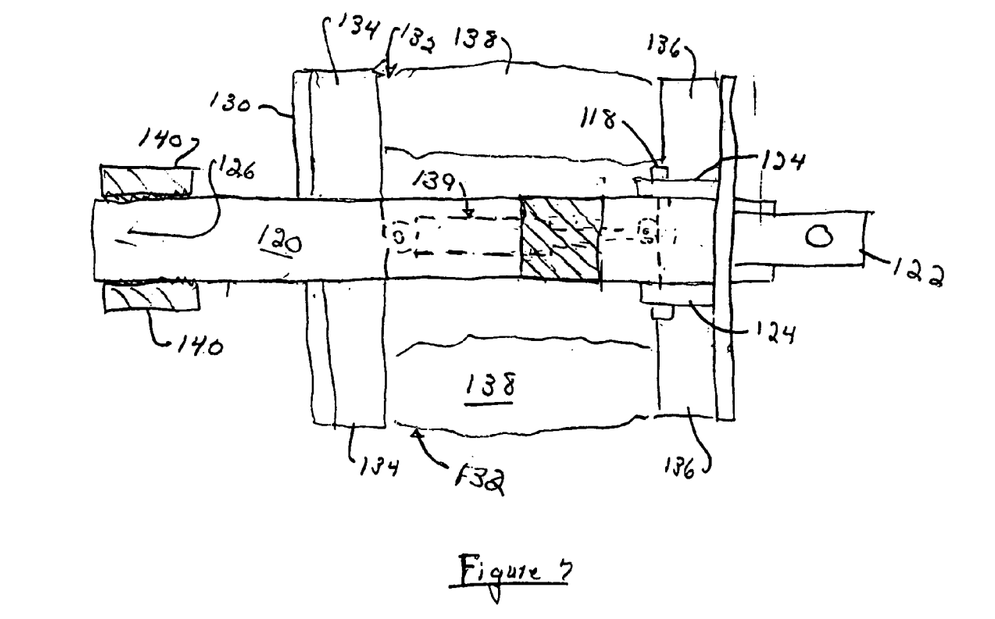
FIG. 7 is a sectional view taken along line 7—7 of FIG. 6.

Referring to FIGS. 6 and 7, a third embodiment 108 is shown. Embodiment 108 includes a base frame or receiver 110 adapted to be attached to the undersurface of the pulling vehicle. A stationary frame 112 includes a bar 114 which is telescopically received within base frame 110 and held by a pin or bolt 115. Depending downwardly from bar 114 is a connecting bar 116 which is welded to horizontal bar 120 having a rear end 126. A hitch frame 123 includes a hitch 122 at its forward end. Hitch frame 123 is pivotally connected to horizontal bar 120 by a pivot pin 118 which extends through bar 120 and is attached to ears 124 on hitch frame 123. The rear end 126 of bar 120 is provided with two spaced apart guide flanges 140 which embrace the upper base frame 110. Depending downwardly from hitch frame 123 is a first bag flange 128. A second bag flange 130 is welded to horizontal bar 120 and extends downwardly therefrom. An air bag 132 is mounted between first flange 128 and the second flange 130. The air bag 132 is attached between a first horizontal cross bar 136 and a second horizontal cross bar 134 which in turn are fixed to first and second flanges 128, 130 respectively. A collapsible bag center 138 includes a quantity of air therein so that when the bag center 138 is collapsed it increases the pressure therein and dampens the downward movement of hitch 122 about the pivotal axis 118. The third embodiment 108 utilizes an air bag 132 which is horizontally disposed as opposed to the vertical disposition of the air bags in the previous embodiments. A shock absorber 139 is also connected between horizontal bars 132, 134. Embodiment 108 may be used with a conventional receiver 110. All that is necessary is to mount bar 114 telescopically inside receiver 110 and secure it in place with bolt 115.

Figure 8:
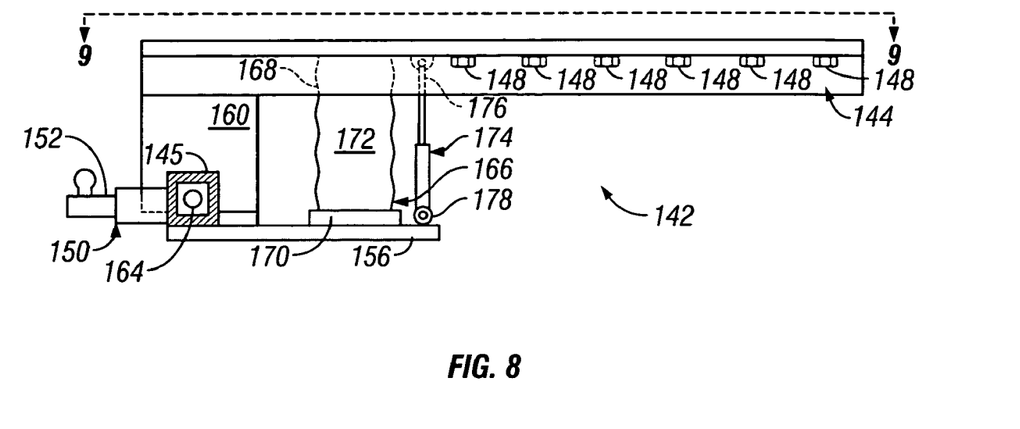
FIG. 8 is a side elevational view of a fourth embodiment of the present invention.
Figure 9:
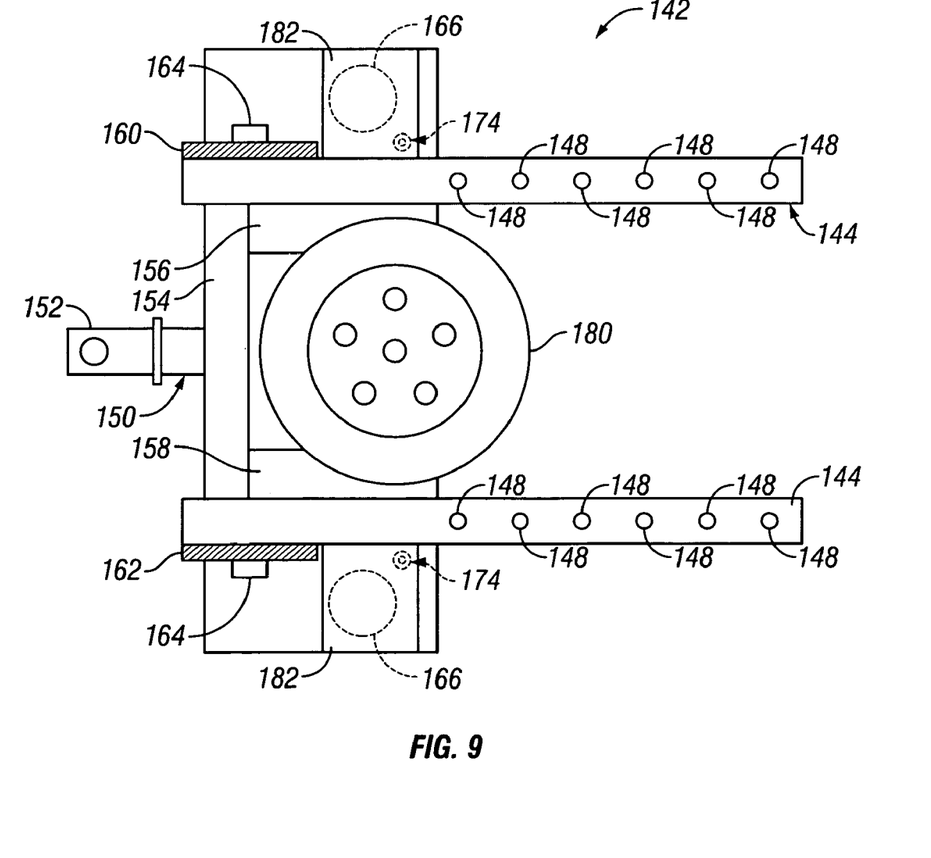
FIG. 9 is a sectional view taken along line 9—9 of FIG. 8.

Referring to FIGS. 8 and 9, a fourth embodiment of the present invention is designated by the numeral 142. Embodiment 142 includes a base frame 144 adapted to be bolted to the undersurface of the pulling vehicle by bolts 148. A hitch frame 150 includes a hitch 152 telescopically received therein as with the previous devices. Hitch frame 150 includes a central hitch bar 154 which extends transversely with respect to the vehicle and a pair of side hitch plates 156, 158 which are welded to the bottom of hitch bar 154 and extend rearwardly therefrom. The hitch frame 150 is pivotally mounted for pivotal movement about a pivot axis 164 between two base frame side plates 160, 162 that are welded to and depend downwardly from the two spaced apart base frames 144.

An air bag 166 includes an upper air bag end 168 which is welded to an upper bag flange 182. Each of the upper bag flanges 182 are welded to one of the two spaced apart base frames 144. Thus the upper bag end 168 is attached to the base frame 144 by upper bag flange 182.

The lower bag end 170 is attached to the side hitch plate 156 which extends rearwardly from the hitch frame 150. Similarly, the lower air bag end 170 of the other air bag 166 is attached to the side hitch plate 158.

The result of this structure is that the pivotal movement of the hitch 152 about axis 164 in a downward direction causes collapsing of the central collapsible member 172 of air bag 166. A shock absorber 174 has its upper end 176 attached to the upper bag flange 182 and its lower end 178 attached to one of the two rearwardly extending flanges 156, 158.

One of the advantages of the present embodiment shown in FIGS. 8 and 9 is that there is room for a spare tire 180 to be positioned between the two base frames 144. This is a feature of the first embodiment shown in FIGS. 2 and 3, and can be incorporated into other embodiments as well. Downward pressure on the hitch 152 of FIGS. 8 and 9 causes the hitch frame 150 to pivot about axis 164 in a counterclockwise direction. This causes the bag 166 to collapse and the bag therefore resists upward movement of the flange 156 or the corresponding downward movement of hitch 152. Similarly, the upward movement of hitch 152 is resisted by the shock absorber 174.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A bumper-pull style trailer hitch operatively attached to a towing vehicle having a front, rear, a transverse direction parallel to a rear axle of the towing vehicle, and a fore-aft direction generally parallel to a travel direction of the towing vehicle, said bumper-pull style trailer hitch adapted to be connected to a trailer, the bumper-pull style trailer hitch comprising:
   two transversely spaced-apart base frame members, both operatively attached to the towing vehicle;
   a bumper-pull style hitch frame, operatively, pivotally attached to the two base frame members such that a rear portion of the hitch frame may move vertically relative to the base frame members; and
   a gas-filled apparatus, disposed under the towing vehicle and operatively attached to at least one of the two base frame members and the hitch frame such that vertical movements of the rear portion of the hitch frame relative to the base frame members result in changes in a pressure of the gas within the gas-filled apparatus.

2. The bumper-pull style trailer hitch of claim 1 wherein the hitch frame comprises:
   a central hitch frame member, elongated in the transverse direction and residing toward the rear of the hitch frame;
   two side hitch frame members, elongated in a fore-aft direction and operatively, rigidly attached near opposite ends of the central hitch frame member from one another;
   two pivots, disposed forward of the central hitch frame member and providing the operative, pivotal attachment of the two side hitch frame members to the two base frame members.

3. The bumper-pull style trailer hitch of claim 2 wherein the gas-filled apparatus comprises two air bags, each operatively connected to one base frame member and one side hitch frame member and each disposed, in the fore-aft direction, between the central hitch frame member and the two pivots.

4. The bumper-pull style trailer hitch of claim 1 wherein the gas-filled apparatus comprises an air bag.

5. The bumper-pull style trailer hitch of claim 1 wherein the gas-filled apparatus comprises two air bags, each operatively connected to one base frame member and one side hitch frame member.

6. The bumper-pull style trailer hitch of claim 1 additionally comprising:
   a shock absorber;
   a first end of the shock absorber;
   a second end of the shock absorber;
   a first pivotal connection, wherein the first end of the shock absorber is operatively, pivotally attached to one of the two base frame members; and
   a second pivotal connection, wherein the second end of the shock absorber is operatively, pivotally attached to the hitch frame and wherein the shock absorber provides damping to the vertical, independent motion of the hitch frame relative to the base frame members.

7. The bumper-pull style trailer hitch of claim 1 wherein the hitch frame comprises:
   a central hitch frame member, elongated in the transverse direction and residing toward the rear of the hitch frame;

a fore-aft hitch frame member, elongated in a fore-aft direction and operatively, rigidly attached to the central hitch frame member;

a pivot, disposed forward of the central hitch frame member and providing the operative, pivotal attachment of the fore-aft hitch frame member to the two base frame members.

8. The bumper-pull style trailer hitch of claim 7 wherein the gas-filled apparatus comprises an air bag, operatively connected to at least one base frame member and the fore-aft hitch frame member and disposed, in the fore-aft direction, in front of the pivot.

9. A method of cushioning vertical forces to a bumper-pull style hitch caused by movements of a trailer relative to a towing vehicle, the trailer and towing vehicle both having a front, a rear, a right side, and a left side, the method comprising:

operatively, rigidly attaching a left side base frame member of the bumper-pull style trailer hitch to the towing vehicle;

operatively, rigidly attaching a right side base frame member of the bumper-pull style trailer hitch to the towing vehicle;

providing a transverse space between the left side base frame member and the right side base frame member;

operatively, pivotally attaching a bumper-pull style hitch frame to the left and right base frame members such that a rear portion of the hitch frame may move vertically relative to the left and right base frame members;

disposing a gas-filled apparatus beneath the towing vehicle;

operatively attaching said gas-filled apparatus to at least one of the left and right base frame members;

operatively attaching said gas-filled apparatus to the hitch frame; and changing a pressure of the gas inside the gas-filled apparatus due to vertical movements of the rear portion of the hitch frame independently of the left and right base frame members.

10. The method of claim 9 wherein operatively, rigidly attaching a left side base frame member to the towing vehicle comprises operatively, rigidly attaching a left side base frame member to a left side towing vehicle frame member.

11. The method of claim 9 wherein operatively, rigidly attaching a right side base frame member to the towing vehicle comprises operatively, rigidly attaching a right side base frame member to a right side towing vehicle frame member.

12. The method of claim 9 wherein installing a gas-filled apparatus comprises installing an air bag.

13. The method of claim 9 additionally comprising operatively, rigidly attaching a hitch ball to the hitch frame.

14. The method of claim 9 wherein changing a pressure of the gas inside the gas-filled apparatus due to vertical movements of the rear portion of the hitch frame relative to the left and right base frame members comprises:

sealing said gas-filled apparatus such that gas can neither enter or escape the gas-filled apparatus; and translating the movements of the rear portion of the hitch frame to changes in a volume of the gas-filled apparatus.

15. The method of claim 9 additionally comprising operatively attaching the trailer to the bumper-pull style trailer hitch.

* * * * *